Dec. 17, 1929.   K. E. PEILER   1,739,519

FEEDING MOLTEN GLASS

Filed Oct. 31, 1925

Inventor:
Karl E. Peiler
by Robert D. Brown
Atty.

Patented Dec. 17, 1929

1,739,519

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

FEEDING MOLTEN GLASS

Application filed October 31, 1925. Serial No. 66,019.

My invention relates to the art of feeding a supply of molten glass in a regular succession of similar mold charges.

One object of my invention is to impart to each mold charge a preliminary configuration appropriate to the contour of the mold cavity in which the charge is to be received, thereby minimizing uneven chilling of the glass and preventing the mold charge from undue distortion or lapping when deposited in the mold.

More specifically, the object of my invention is to employ a cup for receiving and shaping each mold charge prior to depositing it in the mold, and to prevent contact between the mold charge and the cup by providing, within the cup, a protective fluid film which supports the glass in the cup and prevents it from sticking to the cup in spots, as it would tend to do if the glass were allowed to come into direct contact with the walls of the cup.

In carrying out my invention by the apparatus disclosed herein, molten glass flows either steadily or intermittently from an outlet, is received in a partible cup, and is severed periodically by shears operating above the cup. As the shears cut, the halves of the cup separate and allow the glass to fall into a mold or upon a chute which delivers it to the mold. If the flow of glass is constant, it may be regulated by an adjustable plug adjacent to the outlet, and if the flow is intermittent, a plunger, a pneumatic pulsator, or other suitable means, may be employed for accelerating and retarding or reversing the discharge of the glass at the outlet.

Air or other fluid, preferably heated, is blown through apertures in the walls of the cup and is exhausted from the cup through other apertures, in such a way as to maintain a protective fluid film or lining in the cup which serves to support the glass and keep it from direct contact with the cup. Cups of various shapes may be used to shape the mold charges as desired.

Figure 1:
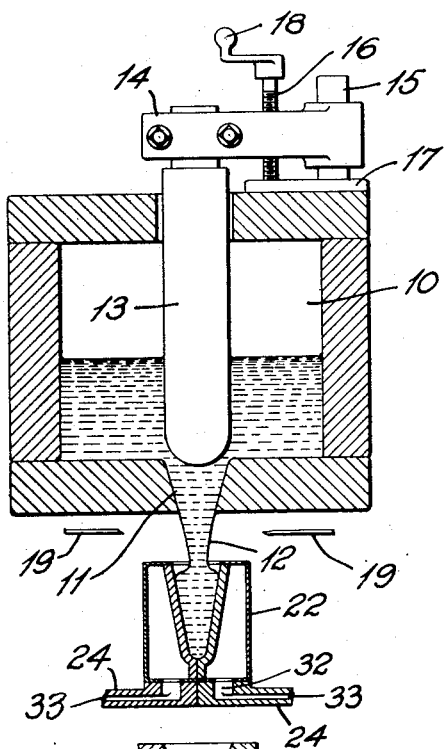
Fig. 1 is a vertical transverse section of a glass feeding apparatus constructed in accordance with my invention.

Referring to the drawings, the numeral 10 indicates a glass feeding receptacle, which may be a forehearth connected to a glass melting furnace, and which has a submerged outlet 11 in its bottom through which a stream 12 of molten glass is permitted to flow. As shown, the flow of glass through the outlet 11 is constant, but it may be made intermittent by any desired means, as stated above.

An implement 13 cooperates with the outlet 11 to control the flow of glass therethrough and, as shown, is carried by an arm 14 which is mounted upon a guide rod 15. The implement 13 may be adjusted vertically in order to regulate the flow of glass through the outlet 11 by means of a jack screw 16 which is threaded through the arm 14 and engages a plate 17. The screw 16 is provided with an operating crank 18.

The glass 12 issuing from the outlet 11 is severed periodically, in order to separate it into mold charges of the desired size, by means of a pair of coacting shear blades 19 whch are mounted beneath the outlet and which may be actuated by any suitable means, not shown.

One of the molds 20 of a glass shaping machine is shown as being mounted upon a table 21 and in a position directly beneath and in axial alignment with the outlet 11.

In order to accumulate the glass and impart a preliminary configuration to it before it is delivered to the mold, I provide a cup 22, preferably having a cavity corresponding in general shape to the contour of the mold cavity. This cup is formed in sections 23 which are mounted on arms 24 for movement into and out of cooperative position above the mold and in axial alignment with the outlet 11.

Figure 3:
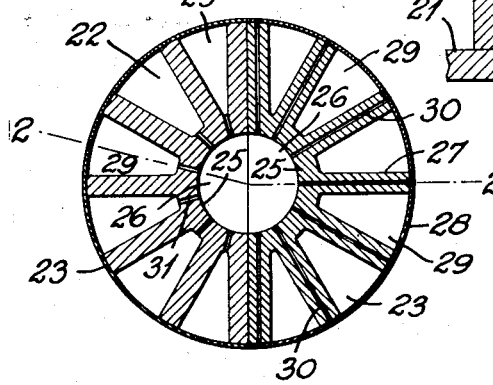
Fig. 3 is a sectional plan view taken on line 3—3 of Fig. 2.
Figure 2:
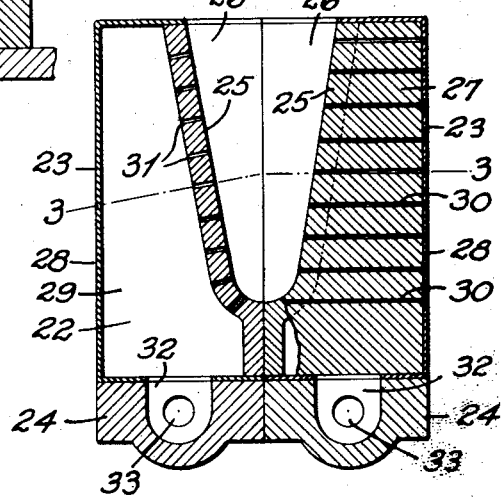
Fig. 2 is a vertical section taken through the halves of the collecting cup on line 2—2 of Fig. 3.

Each half or section 23 of the cup comprises a body portion 25 formed with a recess 26 and with a plurality of radially extending webs 27 (Fig. 3) which are surrounded by a shell 28 to form a plurality of chambers 29 between the webs 27.

Communication is established between the cavity 26 of each section and the outer atmosphere through passages 30 formed in the webs 27 and communication between the cavity and the chambers 29 is established through passages 31.

The chambers 29 of each section all communicate with an arcuate recess 32 which is formed in the supporting arm 24 and which communicates in turn with a passage 33 extending longitudinally of the arm. Air under pressure, preferably heated, is supplied to the recess 32 from any suitable source, not shown.

The air flowing into the cup through the passages 31, and escaping therefrom to the atmosphere through the passages 30, forms a film of air distributed upon the interior walls of the cup, which resiliently supports the mold charge and not only prevents it from contacting with the walls of the cup and sticking thereto but prevents an uneven chilled outer skin or enamel upon the glass. The thickness of this chilled skin may be controlled by varying the temperature of the air film.

It will be observed that the air inlet passages 31 and the air outlet passages 30 are disposed in close proximity to each other so that the air entering the cavity will find an outlet adjacent to its point of entrance before building up sufficient pressure to dislodge or deform the mold charge in the cup. As soon as sufficient glass is received in the cup, it is severed from the stream 12 by the shears 19. The sections of the cup are separated, either at the instant of severance or somewhat before or after the severing time as may be desired, and the shaped mold charge is allowed to fall into the awaiting mold where it is subjected to the necessary shaping operations.

Heated air is ordinarily the most convenient and suitable medium for producing the protective fluid film in the cup. However, other gases may be employed if desired, as well as water vapor and other vapors or liquids.

It will be understood that the structural elements shown herein may be varied in proportion, arrangement and manner of use without departing from my invention as set forth in the appended claims.

It will also be understood that the glass may be received in the cup either before or after it is severed and may be released from the cup either before or after it is severed. The claims are intended to include the several ways of utilizing the invention, irrespective of the order in which the receiving, severing and depositing steps are recited in the claims.

I claim as my invention:

1. The method of feeding molten glass that comprises receiving a mass of glass in a fluid-lined cup, constantly adding fluid to and removing fluid from the lining of the cup at a plurality of spaced places on the inner wall of the cup, severing the glass in the cup from the glass from which said mass has been derived, and depositing the said mass in a mold.

2. The method of shaping a mass of molten glass into a form appropriate to the contour of the mold in which said mass is to be fabricated, that comprises causing molten glass to issue downwardly from an opening in a container, receiving the glass in a shaping cup, providing a layer of fluid between the glass and the walls of the cup, constantly supplying fluid under pressure to and removing fluid from said layer at places spaced along the inner walls of the cup so as to provide a condition of stable equilibrium for the glass in the cup, severing the shaped glass from the parent body of glass, and depositing the shaped mass in a mold.

3. The method of shaping a mass of molten glass into a form appropriate to the contour of the mold in which said mass is to be fabricated, that comprises causing molten glass to issue downwardly from an opening in a container, receiving the glass in a shaping cup, blowing air continuously into said cup and discharging air from said cup mainly through the side walls of the cup so as to provide a layer of air distributed over the inner walls of said cup, thereby preventing the glass in the cup from direct contact with the walls of the cup, severing the glass from the parent body of glass, and depositing the said mass in a mold.

4. The method of shaping a mass of molten glass into a form appropriate to the contour of the mold in which said mass is to be fabricated, that comprises causing molten glass to issue downwardly from an opening in a container, receiving the glass in a partible shaping cup, providing a layer of fluid between the glass and the walls of the cup, constantly supplying fluid to and discharging fluid from said layer, mainly through the walls of said cup, severing the glass above the cup, and separating the parts of the cup to deposit the glass in a mold.

5. The combination, with a glass container having an outlet, of a cup for intercepting glass issuing from said outlet and for imparting a preliminary configuration thereto suitable to the mold in which the glass is to be fabricated, and means for admitting and discharging fluid under pressure to and from the interior of the cup at a plurality of points along the length of the latter so as to interpose a fluid layer between the glass in said cup and the walls of said cup without deforming the mass of glass in the cup.

6. The combination with a glass container having an outlet, of a cup for intercepting glass issuing from said outlet and for imparting a preliminary configuration thereto suitable to the mold in which the glass is to be fabricated, and means for interposing a fluid layer between the glass in said cup and the walls of said cup, said means comprising a plurality of distributed inlet and outlet passages formed in the walls of the cup for the admission and escape of fluid, whereby a suitable film of fluid may be maintained between the cup and the glass.

7. Glass feeding apparatus comprising a cup composed of two cooperating halves adapted to receive and shape charges of molten glass, and means for interposing a fluid layer between the glass in said cup and the walls of said cup and for controlling the pressure of the layer on the glass in the cup so that the glass is given the configuration of the cup without distortion by the fluid.

8. Glass feeding apparatus comprising a cup for receiving and shaping glass mold charges, the inner walls of said cup being provided with openings for the introduction of fluid and with other openings for the discharge of fluid.

9. Glass feeding aparatus comprising a sectional cup having inner walls forming a cavity to receieve masses of molten glass, a plurality of webs radiating outwardly from said inner walls, an outer wall enclosing the inner wall of each section and forming, with said webs, a plurality of chambers, and means for admitting fluid into said chambers, the walls of said cup sections being provided with openings for admitting fluid from said chambers to the interior of said cup, and the said webs being provided with openings for permitting fluid to escape from the interior of said cup.

10. Glass working apparatus comprising a mold for use in fabricating glass articles, a cup having a cavity adapted to impart to the glass a configuration approximating the contour of the mold, means for supplying fluid under pressure to the cup, the inner walls of said cup being provided with openings for the discharge of fluid, whereby a film of fluid may be established along the walls of the cup cavity to prevent contact of the glass with the walls of the cup, and means for delivering glass to the cup and from the cup to the mold.

11. The method of feeding molten glass which comprises flowing molten glass into a cup, interposing a thin film of fluid between the walls of the cup and the glass therewithin for supporting said glass in the cup without contact with the walls of the cup and without distortion of the mass of glass in the cup, permitting escape of fluid from said film, mainly through the walls of the cup, and severing the glass within the cup from its parent body.

12. The method of feeding molten glass which comprises flowing glass into a cup and interposing a constantly changing film of fluid in motion between the inner wall of the cup and the glass therein for spacing the glass from the cup without deformation of the mass within the cup, the extent of motion of the fluid of any portion of the film being relatively slight as compared with the length of the inner wall of the cup.

13. In glass feeding apparatus, a cup for receiving and shaping mold charges of molten glass, and means for causing a constantly changing film of fluid in motion for spacing the glass in the cup from the inner walls of the cup without distorting the shape of the mass of glass in the cup, and so that the extent of motion of the fluid of any portion of the film is relatively slight compared with the length of the inner wall of the cup.

Signed at Hartford, Conn., this 30th day of October, 1925.

KARL E. PEILER.

CERTIFICATE OF CORRECTION.

Patent No. 1,739,519.  Granted December 17, 1929, to

KARL E. PEILER.

It is hereby certified that error appears in the printed specification of the above numbered patent requiring correction as follows: Page 3, line 35, claim 9, after the word "fluid" insert the words "under pressure"; and that the said Letters Patent should be read with this correction therein that the same may conform to the record of the case in the Patent Office.

Signed and sealed this 14th day of January, A. D. 1930.

(Seal)

M. J. Moore,
Acting Commissioner of Patents.